US011057300B2

(12) United States Patent
Li et al.

(10) Patent No.: US 11,057,300 B2
(45) Date of Patent: Jul. 6, 2021

(54) ENERGY-EFFICIENT TRAFFIC SCHEDULING ALGORITHM FOR SDN DATA CENTER NETWORK BASED ON MULTI-LAYER VIRTUAL TOPOLOGY (71) Applicant: Inner Mongolia Agricultural University, Huhehaote (CN)

(72) Inventors: Honghui Li, Huhehaote (CN); Xueliang Fu, Huhehaote (CN); Weidong Li, Huhehaote (CN)

(73) Assignee: Inner Mongolia Agricultural University, Huhehaote (CN)

( * ) Notice: Subject to any disclaimer, the term of this patent is extended or adjusted under 35 U.S.C. 154(b) by 0 days.

(21) Appl. No.: 17/009,319

(22) Filed: Sep. 1, 2020

(65) Prior Publication Data
US 2021/0111994 A1 Apr. 15, 2021

(30) Foreign Application Priority Data
Oct. 10, 2019 (CN) .......................... 201910959834.8

(51) Int. Cl.
*G06F 15/16* (2006.01)
*H04L 12/753* (2013.01)
(Continued)

(52) U.S. Cl.
CPC .............. *H04L 45/48* (2013.01); *H04L 41/12* (2013.01); *H04L 41/142* (2013.01);
(Continued)

(58) Field of Classification Search
CPC ....... H04L 45/48; H04L 41/12; H04L 41/142; H04L 45/122; H04L 45/125; H04L 45/38; H04L 45/12; H04L 45/02
See application file for complete search history.

(56) References Cited

U.S. PATENT DOCUMENTS

8,856,570 B2 * 10/2014 Diab ...................... H04L 12/12
713/323
2011/0249687 A1 * 10/2011 Diab .................... H04L 1/0057
370/474
(Continued)

*Primary Examiner* — Hieu T Hoang
(74) *Attorney, Agent, or Firm* — Piloff Passino & Cosenza LLP; Sean A. Passino; Rachel K. Piloff (57) ABSTRACT

An energy-efficient traffic scheduling algorithm based on multiple layers of virtual sub-topologies is provided. First, a mathematical optimization model for an energy-efficient traffic scheduling problem is established, to minimize network energy consumption while ensuring the capability of bearing all network data flows. Then, the mathematical optimization model is resolved using an energy-efficient traffic scheduling algorithm based on a multi-layer virtual topology, to obtain an energy-efficient scheduling scheme of the data flows. The virtual topology and switch ports in an upper layer are made dormant to save energy. The method can dynamically adjust the working state of the virtual sub-topology in the upper layer according to current link utilization. A path with a minimum number of hops and lowest maximum link utilization can be found in the booted sub-topology, to route the data flow, solving the problem that a "rich-connection" data center network has low energy resource utilization at low load.

6 Claims, 4 Drawing Sheets (51) Int. Cl.
  *H04L 12/24*   (2006.01)
  *H04L 12/733*  (2013.01)
  *H04L 12/729*  (2013.01)
  *H04L 12/721*  (2013.01)

(52) U.S. Cl.
  CPC .......... *H04L 45/122* (2013.01); *H04L 45/125* (2013.01); *H04L 45/38* (2013.01)

(56) References Cited

U.S. PATENT DOCUMENTS

| | | | | |
|---|---|---|---|---|
| 2012/0096211 | A1* | 4/2012 | Davis | H04L 49/351 |
| | | | | 710/314 |
| 2012/0207018 | A1* | 8/2012 | Goldenberg | H04L 12/12 |
| | | | | 370/230 |
| 2014/0047252 | A1* | 2/2014 | Ansari | G06F 1/32 |
| | | | | 713/320 |
| 2015/0026318 | A1* | 1/2015 | Faraboschi | H04L 41/0833 |
| | | | | 709/221 |
| 2019/0319876 | A1* | 10/2019 | Gumaste | H04L 45/28 |

* cited by examiner

ENERGY-EFFICIENT TRAFFIC SCHEDULING ALGORITHM FOR SDN DATA CENTER NETWORK BASED ON MULTI-LAYER VIRTUAL TOPOLOGY

TECHNICAL FIELD

The present invention relates to the field of communications network technologies, and specifically to an energy-efficient traffic scheduling algorithm for a Software Defined Networking (SDN) data center network based on a multi-layer virtual topology.

BACKGROUND

With the rapid development of cloud computing, Internet of Things (IoT), and big data technologies, data centers have increasingly large scales. Energy consumption of the data centers is tremendous and grows constantly, which greatly limits the operation and development of the data centers. Statistics show that in 2015, energy consumption of data centers in China reaches 100 billion KWH, which accounts for over 1.5% of China's total electricity consumption and is equivalent to the annual power output of the whole Three Gorges Dam. With the rapid development of 5G communications and other technologies in recent years, it is estimated that the energy consumption ratio of data centers in China will reach 8% by 2020.

Data center devices include peripheral devices and network devices. Energy consumption of a data center network accounts for 15% to 20% of the total energy consumption of a data center. With the rapid development and deployment of peripheral devices such as servers, storage devices, refrigerating devices, the energy consumption ratio of the network part will grow continuously. To ensure the reliability and availability of the data center, network devices such as switches are seldom or never turned off, and keep running at about 100% power regardless of the load value of the data center network.

To improve the reliability and network capacity of the data center network, many "rich-connection" data center network architectures are proposed, for example, Fat-Tree, Monsoon, BCube, and Helios. Fat-Tree becomes a popular option because it has a simple structure and a large bisection bandwidth, and can provide equal-cost multi-path routing between servers. However, compared with a conventional data center, such a structure introduces more switches, thus further increasing the energy consumption of the network. Current data center networks mostly use an equal-cost multi-path (ECMP) routing algorithm to schedule data flows.

In a Fat-Tree data center network, there are multiple equal-cost paths to reach any destination server node. According to the ECMP algorithm, one of the paths is selected by using a static hash function, to route the data flow, thereby realizing load balancing. However, the ECMP algorithm does not take the energy consumption of the network into consideration. In the Fat-Tree data center network, when the network traffic load is relatively low, the energy consumption of the network may be reduced by using an energy-efficient traffic scheduling method and making idle switch devices dormant, so as to improve energy resource utilization. The basic idea of this method is to bear the current data flow by using some of switch devices and ports while making idle network switches and ports dormant, thereby reducing the total energy consumption of the network. Therefore, it is required to perform global monitoring on the data center network and to manage and schedule resources uniformly. Moreover, the switches need to have strong computing power and a convenient state switching (turn-on/dormant) capability. However, in the conventional data center network, route forwarding tables of the switches are all computed independently in a distributed manner.

As a novel network architecture, Software Defined Networking (SDN) provides a new platform for implementing energy-efficient traffic scheduling of the data center network. The SDN separates a control plane from a data forwarding plane of the network switch device, to form a logically uniform controller to implement centralized scheduling and management for network communication traffic and network resources. In an SDN data center network, switch devices and ports thereof can be made dormant or booted conveniently.

The SND technology greatly improves the computing power of the data center network, realizes fine-grained management for network resources such as switches and ports, and easily achieves dormancy or wake-up of the devices. Hence, energy conservation of the SDN-based data center network becomes a research hotspot currently.

Heller et. al. put forward an ElasticTree mechanism to realize energy conservation of the data center network, and provide network scalability. This mechanism dynamically adjusts active states of switches and links according to the communication load of the network. Experiments show that this method can save as much as 50% of network energy consumption while ensuring the capability of bearing surging communication data.

To reduce the energy consumption of the "rich-connection" (such as Fat-Tree) data center network, Shang et. al. put forward an energy-aware routing method from the perspective of routing. The core concept of the method is to use as few network devices as possible to provide a routing service without damaging network performance; meanwhile, idle network devices are dormant, thereby saving energy. Tu et. al. put forward two different energy saving algorithms for the data center network. The algorithms can be applied in different scenarios, such as a latency-sensitive application or a latency-insensitive application, and are irrelevant to network topology. Through SDN centralized management and traffic pre-processing, 30% to 40% of energy consumption can be saved.

However, the three methods above usually cause low utilization of some non-bottleneck links or switches in high-level data centers, and cause unnecessary energy consumption. In addition, the algorithms put forward by Tu et. al. are complex, and increase the burden of the SDN controller.

Li et. al. put forward a new energy-aware exclusive routing traffic scheduling method, namely, Exclusive Routing (EXR). The core concept thereof is to schedule data flows in chronological order so that each data flow exclusively occupies the link bandwidth on the route. In this way, no bottleneck link appears in the data center network, thus improving the utilization of active switches and links, and saving energy of the data center network. Experiments show that this method outperforms a fair-sharing routing method in terms of energy conservation and average completion time. However, this method cannot ensure energy efficiency of switches, because a path of available links is selected based on a greedy policy, and data flows are scheduled in a priority order.

In this application, based on a constructed multi-layer virtual topology, a higher-layer virtual topology is booted or turned off according to a current network load condition, which not only saves energy consumption but also reduces the algorithm complexity. By pre-booting dormant switches, network latency is reduced.

SUMMARY

An objective of the present invention is to provide an energy-efficient traffic scheduling algorithm based on multiple layers of virtual sub-topologies (EMV-SDN), to solve the problem that a "rich-connection" data center network has low energy resource utilization at low load. First, a mathematical optimization model for an energy-efficient traffic scheduling problem is established, to minimize network energy consumption while ensuring the capability of bearing all network data flows. Then, the mathematical optimization model is resolved using an energy-efficient traffic scheduling algorithm based on a multi-layer virtual topology, to obtain an energy-efficient scheduling scheme of the data flows. The virtual topology and switch ports in an upper layer are made dormant to save energy.

To achieve the above purpose, the present invention provides the following technical solution: An energy-efficient network traffic scheduling algorithm for a Software Defined Networking (SDN) data center based on a multi-layer virtual topology includes the following steps:

S1: establishing an integer linear programming (ILP) mathematical optimization model for an energy-efficient traffic scheduling problem, where an objective function is to minimize network energy consumption, and conditions to be satisfied include a link bandwidth constraint condition and a flow conservation constraint condition, and then resolving the model by using an energy-efficient traffic scheduling algorithm;

S2: in an initialization stage of the energy-efficient scheduling algorithm, dividing, by an SDN controller, a collected topological structure of a data center network into multiple layers of virtual topologies, and booting a first-layer virtual topology while putting other higher-layer virtual topological structures to dormancy;

S3: first calculating, by the SDN controller, maximum link utilization $u_l$ for a data flow that newly arrives at the network, and determining to boot or turn off the virtual topology in an upper layer according to a value of the maximum link utilization; and S4: selecting, by the controller, a suitable path from a K-shortest path set in the currently booted virtual topology, to route the data flow.

Further, the ILP mathematical optimization model in step S1 includes minimizing the network energy consumption while bearing all network load, and the objective function is as follows:

$$\min \sum_{\ell \in L} COS T_\ell x_\ell + \sum_{v \in V} COST_v y_v$$

where $G(V, L)$ represents a data center network, L represents a data link set, $\ell$ represents any link, V represents a set of switch nodes, v represents any switch node, $COS T_\ell$ represents energy consumption of any link $\ell$, $COST_v$ represents energy consumption of the switch node v, $x_\ell$ and $y_v$ represent a link state and a switch state respectively, 0 represents turning off, and 1 represents booting.

Further, the link bandwidth constraint condition of the ILP mathematical optimization model in step S1 is:

$$\sum_{f \in F} b_f z_f^\ell \leq c_\ell x_\ell$$

where F represents a set of data flows borne by the data center network, f represents a data flow, $b_f$ represents a bandwidth of the data flow, $c_l$ represents a link bandwidth, $z_f^\ell$ represents a state of the data flow f borne by the link $\ell$, 0 represents the data flow is not borne, and 1 represents that the data flow is borne.

Further, the flow conservation constraint condition of the ILP mathematical optimization model in step S1 is:

$$\sum_{\ell \in L_{v'}} b_f z_f^\ell - \sum_{\ell \in L_{v''}} b_f z_f^\ell = \begin{cases} -b_f & v = v_f^s, f \in F \\ b_f & v = v_f^d, f \in F \\ 0 & v \in v - \{v_f^s, v_f^d\}, f \in F \end{cases}$$

where $L_v$ represents a set of links connected to a switch v, $L_{v'}$ represents a set of incoming links of the node, $L_{v''}$ represents a set of all outgoing links, and $v_f^s$ and $v_f^d$ represent a source and a destination of any data flow.

Further, the division into the multiple layers of virtual topologies in step S2 specifically includes the following steps:

S21: collecting, by the SDN controller, topology information of the data center network by using an address resolution protocol (ARP);

S22: generating, by using a minimum spanning tree algorithm, a plurality of independent minimum spanning trees with core switches as root nodes according to the number n of the core switches; and storing the core switch and links in each minimum spanning tree into a Gi(Vi, Li);

S23: selecting G0 as a first-layer virtual topology, VG1=(V0, L0);

S24: combining the first-layer virtual topology VG1 with G1 to form a second-layer virtual topology VG2, where a forming method is defined as follows:
 a) a node set of VG2 is defined as $V_0 \cup V_1 - V_0$; and
 b) a link set of VG2 is defined as $L_0 \cup L_1 - L_0$;

S25: combining the second-layer virtual topology VG2 with G2 to form a third-layer virtual topology VG3, and so on, to sequentially form higher-layer topologies; and S26: booting the first-layer virtual topology VG1, that is, booting switches in the first-layer virtual topology VG1 and setting all the links to a working state, and rendering the links in green; setting all switches and links in other higher-layer topologies to a dormant state, and rendering all the links in red.

Further, step S3 specifically includes the following steps:

S31: if the maximum link utilization $u_l$>threshold 1, pre-booting the virtual topology in the upper layer, and rendering all the links therein in yellow; otherwise, going to step 34;

S32: if the maximum link utilization $u_l$>threshold 2, booting the virtual topology in the upper layer, and rendering all the links therein in green; otherwise, going to step 34;

S33: if the virtual topology in the upper layer is pre-booted/booted, putting ports with no connected links in the newly booted switches to dormancy;

S34: selecting a path from K-shortest paths, so that all links on the path are green and the maximum link utilization $u_l$ is smallest, and routing the data flow on the path; and S35: collecting and calculating the maximum link utilization $u_l$, and if duration in which $u_l$ is less than the threshold 1 is longer than T and the topology in the upper layer has been booted, putting the upper layer to dormancy after transfer of the data flow is finished, that is, putting the switches to dormancy and rendering all the links in red.

The present invention has the following beneficial effects: in the case of multi-layer virtual topology, the energy-efficient traffic scheduling algorithm for an SDN data center network based on a multi-layer virtual topology (EMV-SDN) has a lower energy consumption ratio and a shorter average completion time than ECMP and Dijkstra algorithms. The EMV-SDN algorithm can dynamically adjust a working state of a virtual sub-topology in an upper layer according to current link utilization, thereby saving energy. Moreover, by using the EMV-SDN algorithm, a path with a minimum number of hops and lowest maximum link utilization can be found in the booted sub-topology, to route the data flow.

DETAILED DESCRIPTION

To help a person of ordinary skill in the art better understand the technical solution of the present invention, the technical solution of the present invention is further described with reference to the embodiments.

In this embodiment, an energy-efficient traffic scheduling algorithm based on multiple layers of virtual sub-topologies (EMV-SDN) is implemented in an SDN data center network with a Fat-Tree topology. First, a mathematical optimization model for an energy-efficient traffic scheduling problem is established, to minimize network energy consumption while ensuring the capability of bearing all network data flows. Then, the mathematical optimization model is resolved using an energy-efficient traffic scheduling algorithm based on a multi-layer virtual topology, to obtain an energy-efficient scheduling scheme of the data flows. The virtual topology and switch ports in an upper layer are made dormant to save energy.

This embodiment includes the following steps:

S1: establish an integer linear programming (ILP) mathematical optimization model for an energy-efficient traffic scheduling problem, where an objective function is to minimize network energy consumption, and conditions to be satisfied include a link bandwidth constraint condition and a flow conservation constraint condition, and then resolve the model by using an energy-efficient traffic scheduling algorithm.

S2: in an initialization stage of the energy-efficient scheduling algorithm, an SDN controller divides a collected topological structure of a data center network into multiple layers of virtual topologies, and boots a first-layer virtual topology while putting other higher-layer virtual topological structures to dormancy.

S3: the SDN controller first calculates maximum link utilization $u_l$ for a data flow that newly arrives at the network, and determines to boot or turn off the virtual topology in an upper layer according to a value of the maximum link utilization.

S4: the controller selects a suitable path from a K-shortest path set in the currently booted virtual topology, to route the data flow.

The integer linear programming (ILP) mathematical optimization model in step S1 is specifically as follows:

$$\min \sum_{\ell \in L} COST_\ell x_\ell + \sum_{v \in V} COST_v y_v \quad (1)$$

$$\sum_{f \in F} b_f z_f^\ell \leq c_\ell x_\ell \ \ell \in L \quad (2)$$

$$\sum_{\ell \in L_{v'}} b_f z_f^\ell - \sum_{\ell \in L_{v''}} b_f z_f^\ell = \begin{cases} -b_f & v = v_f^s, f \in F \\ b_f & v = v_f^d, f \in F \\ 0 & v \in v - \{\{v_f^s, v_f^d\}, f \in F \end{cases} \quad (3)$$

$$x_\ell \leq y_v \ v \in V, \ell \in L_v \quad (4)$$

$$y_v \leq \sum_{\ell \in L_v} x_\ell \ v \in V \quad (5)$$

$$x_\ell, y_v, z_f^\ell \in \{0, 1\} \ f \in F, \ell \in L, v \in V \quad (6)$$

Total energy consumption of the data center network is defined as energy consumption of all active (working-state) switches and links in the network.

Graph G(V, L) represents a data center network, where L is a data link set, and a capacity of a link $\ell$ is $c_l$. V is a set of switch nodes, and v represents any switch node. $L_v$ represents a set of links connected to the switch v, $L_{v'}$ represents a set of incoming links of the node, and $L_{v''}$ represents a set of all outgoing links. A set of data flows borne by the data center network is denoted by F, and for any data flow, its source, destination and bandwidth are denoted by $v_f^s$, $v_f^d$, and $b_f$ respectively. $COST_\ell$ represents energy consumption of any link $\ell$, and is energy consumption of two endpoints (that is, switch ports) of the link. $COST_v$ represents energy consumption of the switch node v, and refers to energy consumption of a rack and a line card of the switch. $x_l$, $y_v$, and $z_f^\ell$ represent decision variables, $x_l$ indicates whether the link $\ell$ is in an active state, $y_v$ indicates whether the switch is in a working state, and $z_f^\ell$ indicates whether the link l bears a data flow f.

Formula (1) is the objective function, which is to minimize the total energy consumption of the data center network.

Formula (2) is the link bandwidth constraint condition. It indicates that a total bandwidth of data flows that can be borne by any active link should not exceed a total bandwidth of the link, and a link in a dormant state cannot bear any data flow.

Formula (3) is the flow conservation constraint condition. For any data flow f, if the node v is a source node of the data flow, the node only has an outgoing data flow; if v is a destination node of the data flow, the node only has an incoming data flow; otherwise, for any intermediate node v, an incoming data flow is the same as an outgoing data flow.

Formula (4) indicates that for any switch node v, if v is in a dormant state, all links connected to the node are in a dormant state.

Formula (5) means that if all links connected to the switch node v are in a dormant state, the switch v may be set to a dormant state.

Formula (6) illustrates value ranges of the variables.

To resolve the mathematical optimization model established above, the present invention provides an energy-efficient traffic scheduling algorithm based on a multi-layer virtual topology (MVE-SDN) for the SDN data center network. In this algorithm, the topology of the data center network is first divided into multiple layers of virtual topologies, and a first-layer virtual topology is booted. Then, for a data flow that newly arrives, it is determined whether to boot or turn off the topology in an upper layer according to maximum link utilization of the virtual topology in the current layer. Finally, a path is computed by using an improved greedy algorithm to schedule the data flow.

Figure 1:
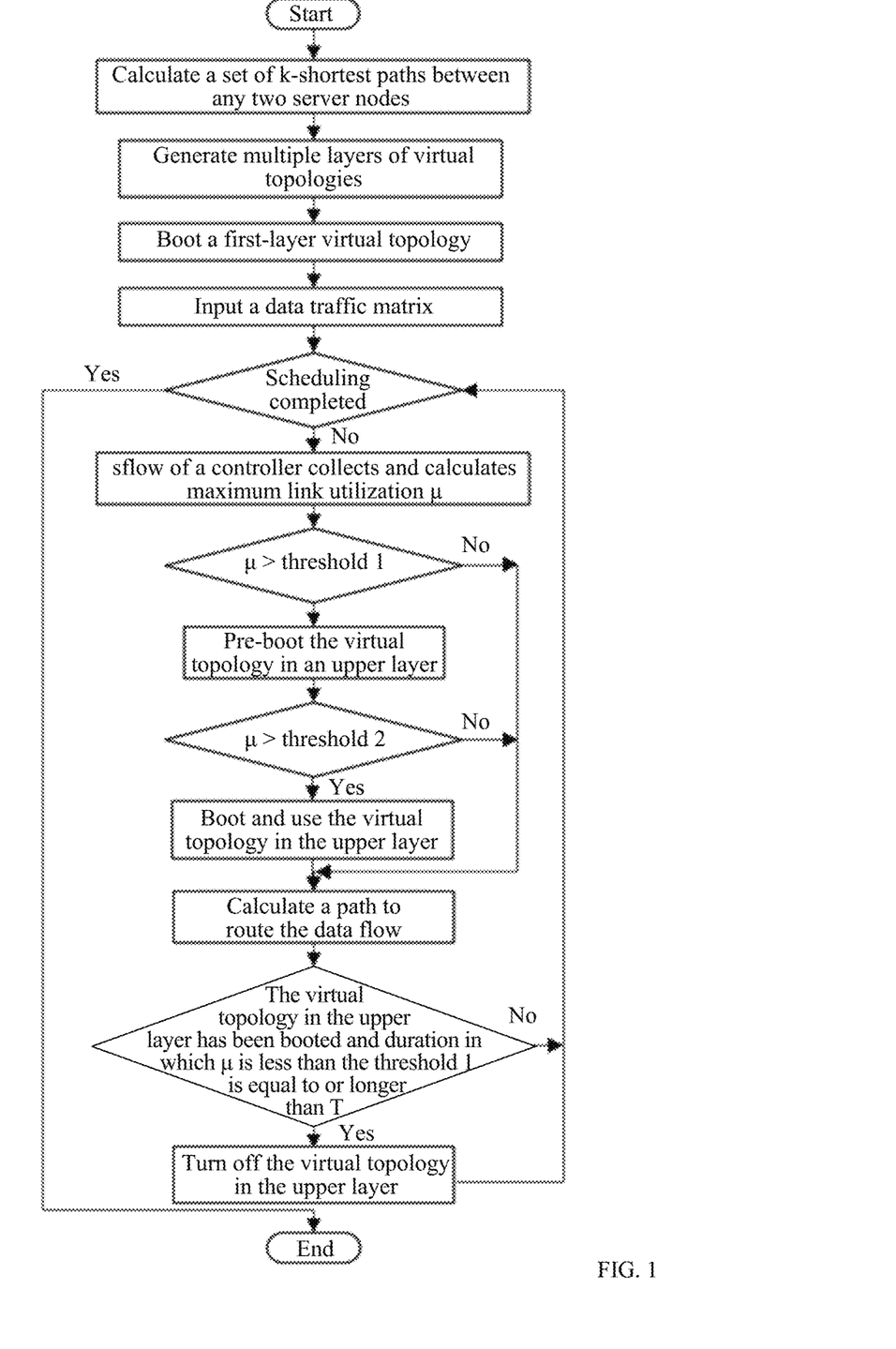
FIG. 1 is a flowchart of an energy-efficient traffic scheduling algorithm according to the present invention.

Referring to FIG. 1, in the initialization stage of the energy-efficient scheduling algorithm, a set of K-shortest paths between any two terminal nodes is calculated according to the topological structure of the data center network, and the physical topology is divided into multiple layers of virtual sub-topologies (that is, multiple layers of virtual sub-topologies such as a first layer, a second layer, and a third layer). The first-layer virtual topological structure is booted, and other higher-layer virtual topological structures are made dormant. For a data flow that newly arrives at the network, the maximum link utilization $u_l$ is calculated first, and it is determined, according to the value of the maximum link utilization, whether to boot the topology in the upper layer. Then, a suitable path is selected from the K-shortest path set in the currently booted virtual topology, to route the data flow.

The division into the multiple layers of virtual sub-topologies in step S2 specifically includes the following steps:

S21: the SDN controller collects topology information of the data center network by using an address resolution protocol (ARP).

S22: generate, by using a minimum spanning tree algorithm (kruskal algorithm), a plurality of independent minimum spanning trees MSTi (i=0, 1, 2 . . . , n) with core switches as root nodes according to the number n of the core switches; and store the core switch and links in each MSTi into a graph Gi(Vi, Li) (i=0, 1, 2 . . . , n).

S23: select G0 as a first-layer virtual topology VG1=(V0, L0).

S24: combine the first-layer virtual topology VG1 with G1 to form a second-layer virtual topology VG2, where a forming method is defined as follows:
 a) a node set of VG2 is defined as $V_0 \cup V_1 - V_0$; and
 b) a link set of VG2 is defined as $L_0 \cup L_1 - L_0$.

S25: combine the second-layer virtual topology VG2 with G2 to form a third-layer virtual topology VG3, and so on, to sequentially form higher-layer topologies, where the forming method is described above. For the Fat-Tree topological structure, each MSTi is unique, and a top-layer topology formed after combination is the original physical topology.

S26: boot the first-layer virtual topology VG1, that is, boot switches in the first-layer virtual topology VG1 and set all the links to a working state, and render the links in green; and set all switches and links in other higher-layer topologies to a dormant state, and render all the links in red.

The higher-layer virtual topologies are sequentially formed by using the foregoing method to achieve the following objectives: first, when the virtual topology in an upper layer, such as VG2, is to be booted, it is only necessary to boot dormant nodes and links, without repeatedly booting the nodes and links in VG1; moreover, when the virtual topology in an upper layer, such as VG2, is to be turned off, it is only necessary to turn off the exclusive nodes and links thereof. This not only simplifies the operation but also saves the storage space of the topological structure.

When the mathematical model is resolved by using the energy-efficient traffic scheduling algorithm, step S3 of calculating maximum link utilization $u_l$ for a data flow that newly arrives at the network, and determining whether to boot the topology in an upper layer according to a value of the maximum link utilization specifically includes the following steps:

S31: if $u_l$ >threshold 1, pre-boot the virtual topology in the upper layer, and render all the links therein in yellow; otherwise, go to step 34.

S32: if $u_l$ >threshold 2, boot the virtual topology in the upper layer, and render all the links therein in green; otherwise, go to step 34.

S33: if the virtual topology in the upper layer is pre-booted/booted, put ports with no connected links in the newly booted switches to dormancy.

S34: select a path from K-shortest paths, so that all links on the path are green and the maximum link utilization is smallest, and route the data flow on the path.

S35: collect and calculate the maximum link utilization $u_l$, and if duration in which $u_l$ is less than the threshold 1 is longer than T and the topology in the upper layer has been booted, put the upper layer to dormancy after transfer of the data flow is finished, that is, put the switches to dormancy and render all the links in red.

Simulation Experiments:

To check the performance of the proposed energy-efficient traffic algorithm based on a multi-layer virtual topology (EMV-SDN), a data center network topology of a Fat-tree type is built by using a Floodlight controller and a Mininet simulation platform.

An energy consumption ratio and an average completion time of a data flow are used as indicators for measuring the performance of the algorithm.

The energy consumption ratio is calculated by using the following formula $$\text{Energy consumption ratio} = \frac{COST_e}{COST_0} \qquad (7)$$

where $COST_e$ is energy consumption when the energy-efficient scheduling algorithm is adopted, and $COST_0$ is energy consumption without any energy-saving measures. As can be learned, for different energy-efficient scheduling algorithms, a lower energy consumption ratio indicates a better energy-saving effect of the algorithm.

In the multi-layer virtual topology, the proposed EMV-SDN is compared with the ECMP algorithm and the Dijkstra shortest path algorithm. Experiment results show that the EMV-SDN outperforms other two algorithms in terms of the energy consumption ratio, the average completion time and the like.

1. Experiment Settings 1.1 Network Topology

Figure 2:
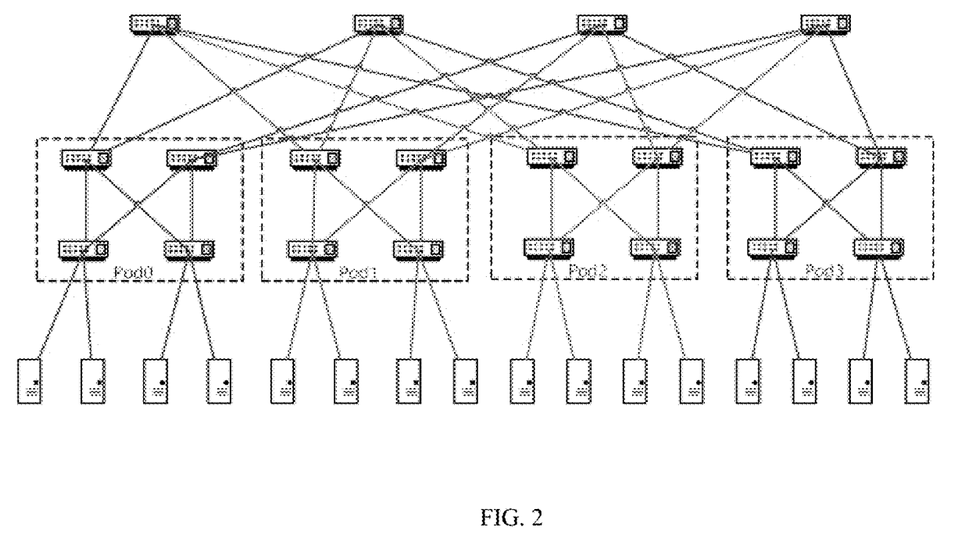
FIG. 2 shows a Fat-Tree topological structure according to the present invention.

A Fat-tree network topology with k=4, as shown in FIG. 2, is selected, and simulation experiments are carried out in the Mininet platform. All switches are OpenFlow switches with 48 ports, and each link has a bandwidth of 100 Mb/s.

1.2 Traffic Mode

The tool software Iperf is selected to generate a data flow in the data center network. Each host generates a flow with a different length at a different time. The lengths of the data flows comply with the exponential distribution, and the generation times of the flows comply with the Poisson distribution. A destination node of the data flow is determined by using a Random mode, a Staggered mode, and a Stride mode respectively.

(1) Random: a host i sends data to a host j randomly at an equal probability p.

(2) Staggered ($p_e$, $p_p$): a host i sends data to an upper-layer edge switch of the same pod at a probability of $p_e$, sends data to a host of the same pod at a probability of $p_p$, and sends data to hosts of other pods at a probability of $1-(p_e+p_p)$.

(3) Stride (x): a host i sends data to hosts (i+x)mod n, where n is the total number of hosts in the data center network.

1.3 Switch Energy Consumption

Energy consumption of a switch includes energy consumption of components such as a rack, a line card, and ports. Components in different types of switches have different energy consumption. Table 1 shows energy consumption data of components in different types of switches.

TABLE 1

Energy consumption of switch components (unit: watt)

| Switch type | Port | Rack & Line | All ports booted | All ports booted |
|---|---|---|---|---|
| Edge switch | 0.90 | 135 | 178 | 183 |
| Core switch | 1.19 | 176 | 233 | 239 |

2. Comparison of Energy Consumption Ratios

Figure 3:
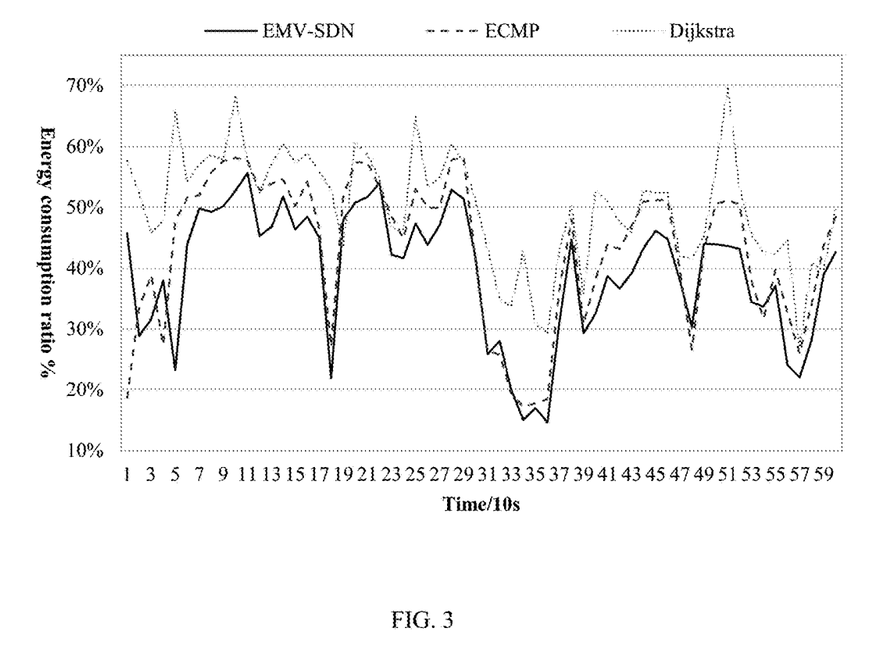
FIG. 3 shows energy consumption ratios in a Random mode in simulation experiments according to the present invention.
Figure 4:
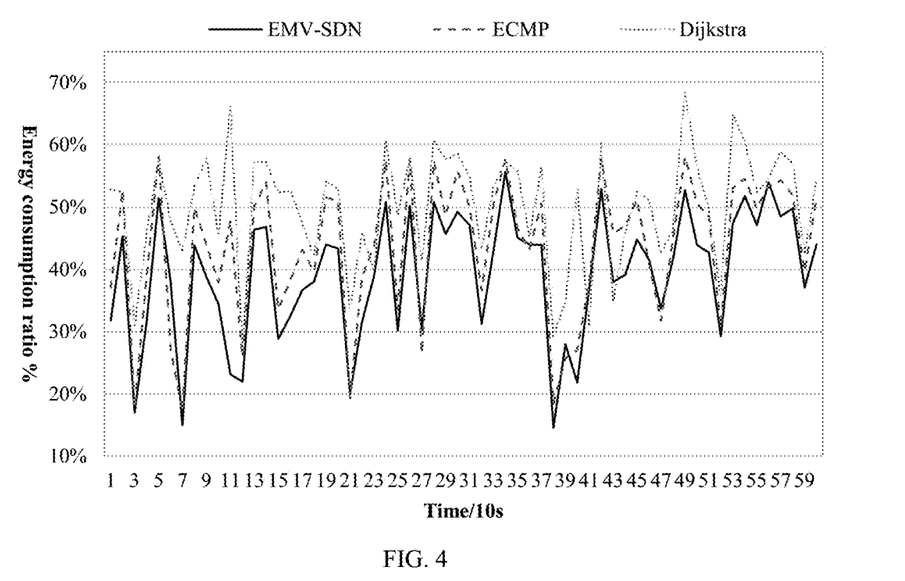
FIG. 4 shows energy consumption ratios in a Staggered mode in simulation experiments according to the present invention.
Figure 5:
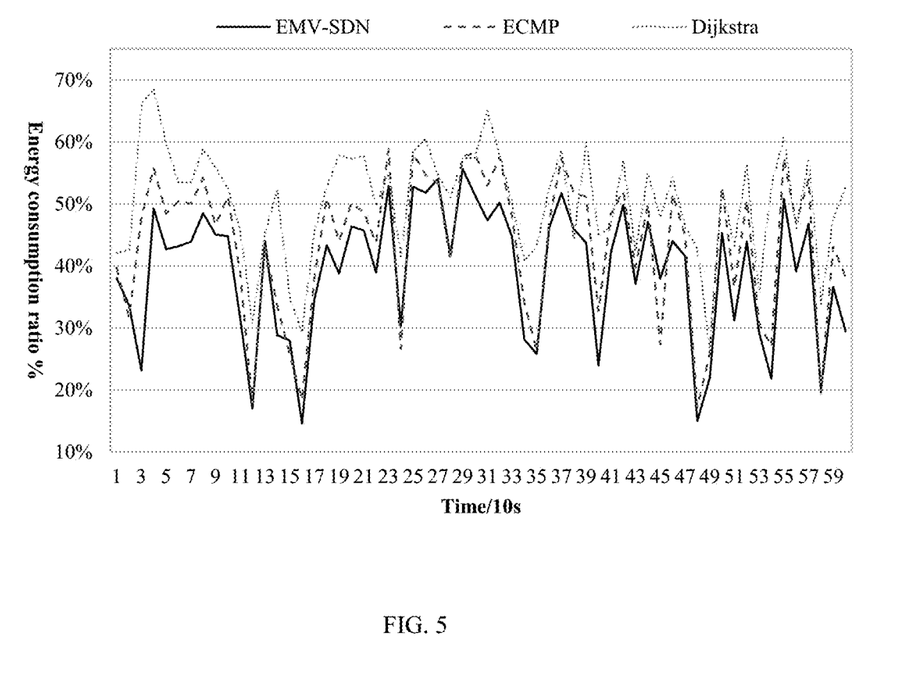
FIG. 5 shows energy consumption ratios in a Stride mode in simulation experiments according to the present invention.

In the foregoing three traffic modes, the energy consumption ratio of the EMV-SDN algorithm is compared with those of the ECMP and Dijkstra algorithms. Multiple experiments are carried out, and each experiment lasts about 30 minutes. The energy consumption of the data center network is calculated by taking the 10 minutes in the middle. FIG. 3 to FIG. 5 show the comparison results of the three algorithms in the three traffic modes, where the abscissa represents the experiment duration, and the ordinate represents the energy consumption ratio of the data center network. The solid line in the figure represents the energy consumption ratio when the EMV-SDN is adopted, and the dashed line and dotted line represent the energy consumption ratio when the ECMP algorithm and the Dijkstra algorithm are adopted respectively.

2.1 Random Traffic Mode

FIG. 3 shows a comparison result of the energy consumption ratios of the three algorithms in the Random mode. As can be learned from the figure, compared with the ECMP algorithm, the EMV-SDN algorithm reduces the energy consumption ratio by 1.5% to 7.81%, and the energy consumption ratio is reduced by 2.25% on average. Compared with the Dijkstra algorithm, the EMV-SDN algorithm reduces the energy consumption ratio by 0.75% to 42.92%, and the energy consumption ratio is reduced by 6.52% on average.

2.2 Staggered Mode

In the Staggered mode, values of $p_e$ and $p_p$ are 0 and 0.2 respectively. FIG. 4 shows the energy consumption ratios of the three algorithms in the Staggered mode. As can be learned from the figure, compared with the ECMP algorithm, the EMV-SDN algorithm reduces the energy consumption ratio by 1.44% to 24.61%, and the energy consumption ratio is reduced by 2.52% on average. Compared with the Dijkstra algorithm, the EMV-SDN algorithm reduces the energy consumption ratio by 1.25% to 42.91%, and the energy consumption ratio is reduced by 6.65% on average.

2.3 Stride Mode

In the Stride mode, the value is set to 6. FIG. 5 shows the energy consumption ratios of the three algorithms in the Stride mode. As can be learned from the figure, compared with the ECMP algorithm, the EMV-SDN algorithm reduces the energy consumption ratio by 0.75% to 24.62%, and the energy consumption ratio is reduced by 4.27% on average. Compared with the Dijkstra algorithm, the EMV-SDN algorithm reduces the energy consumption ratio by 0.63% to 42.89%, and the energy consumption ratio is reduced by 10.77% on average.

It can be learned from FIG. 3 to FIG. 5 that, in the three communication modes, the proposed EMV-SDN algorithm has lower energy consumption than the ECMP algorithm and the Dijkstra algorithm, because in the EMV-SDN algorithm, the working state of the virtual sub-topology in the upper layer can be dynamically adjusted according to the current link utilization, thereby saving energy. In addition, in the EMV-SDN algorithm, a path with a minimum number of hops and lowest maximum link utilization can be found in the booted sub-topology, to route the data flow. In the ECMP algorithm, the link state is not taken into consideration, and the flow is randomly scheduled to a shortest path, failing to adjust the path according to topological changes. The Dijkstra algorithm only calculates a shortest path, but cannot combine the link state and the link utilization desirably, which may cause links on the shortest path to be overcrowded. As a result, the virtual sub-topology in the upper layer is booted too early, causing the energy consumption to be higher than that of the other two algorithms.

3. Comparison of Average Completion Times

Figure 6:
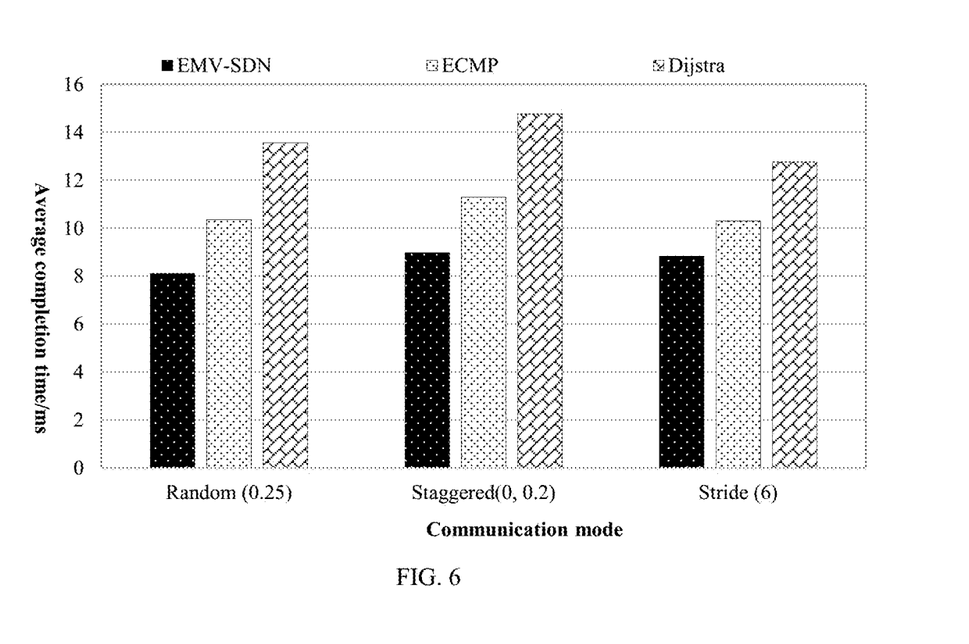
FIG. 6 shows completion time ratios of algorithms in different communication modes in simulation experiments according to the present invention.

FIG. 6 is a diagram showing average completion times of the three algorithms, namely, EMV-SDN, ECMP and Dijkstra. In the figure, the abscissa represents the three traffic modes, the ordinate represents the average completion time, and the data series respectively represent the average completion times of the three algorithms. As can be seen from the figure, the EMV-SDN algorithm has the shortest average completion time in the three communication modes. Compared with ECMP and Dijkstra, the energy-efficient scheduling algorithm EMV-SDN reduces the average completion time of the data flow by 22% and 40% respectively in the Random mode; in the Staggered mode, the average completion time is reduced by 14% and 31% respectively; in the Stride mode, the average completion time is reduced by 21% and 39% respectively. In terms of the average completion time, the EMV-SDN algorithm outperforms ECMP and Dijkstra, because in the EMV-SDN algorithm, a path can be calculated in time according to the link color and link utilization when the topological structure changes, to schedule the data flow, thereby reducing link congestion, so that the data flow can quickly reach the destination. In the ECMP algorithm, the link utilization is not taken into consideration in flow scheduling, and the traffic is randomly allocated to a shortest path, which may result in link congestion and delay the arrival time of the flow. In the Dijkstra algorithm, a shortest path is found to route the data flow, while the link utilization is not taken into consideration either. Moreover, the Dijkstra algorithm is not adaptive to changes of the network virtual topology. As a result, the data flow scheduled by using the Dijkstra algorithm has the longest average completion time.

To solve the problem that a "rich-connection" data center network has low energy resource utilization at low load, the present invention provides an energy-efficient traffic scheduling mechanism for an SDN data center network of a Fat-Tree type. First, an integer linear programming (ILP) mathematical optimization model for an energy-efficient traffic scheduling problem is established. Then, the mathematical model is resolved using an energy-efficient traffic scheduling algorithm based on a multi-layer virtual topology, to obtain an energy-efficient data flow scheduling path. Idle network switch devices and ports are made dormant to achieve the objective of reducing the total energy consumption of the data center. Simulation experiment results show that the proposed energy-efficient traffic scheduling mechanism based on the multi-layer virtual topology (EMV-SDN) is better than the ECMP algorithm and the Dijstra shortest path algorithm. In three different communication modes, EMV-SDN outperforms the other two algorithms in terms of the energy consumption ratio and the average completion time.

The basic principles, main features, and advantages of the present invention are shown and described above. It should be understood by those skilled in the art that, the present invention is not limited by the aforementioned embodiments. The aforementioned embodiments and the description only illustrate the principle of the present invention. Various changes and modifications may be made to the present invention without departing from the spirit and scope of the present invention. Such changes and modifications all fall within the claimed scope of the present invention. The protection scope of the present invention is defined by the appended claims and their equivalents.

What is claimed is:

1. An energy-efficient network traffic scheduling algorithm for a Software Defined Networking (SDN) data center based on a multi-layer virtual topology, comprising the following steps:
   S1: establishing an integer linear programming (ILP) mathematical optimization model for an energy-efficient traffic scheduling problem, wherein an objective function is to minimize network energy consumption, and conditions to be satisfied comprise a link bandwidth constraint condition and a flow conservation constraint condition, and then resolving the model by using an energy-efficient traffic scheduling algorithm;
   S2: in an initialization stage of the energy-efficient scheduling algorithm, dividing, by an SDN controller, a collected topological structure of a data center network into multiple layers of virtual topologies, and booting a first-layer virtual topology while putting other higher-layer virtual topological structures to dormancy;
   S3: first calculating, by the SDN controller, maximum link utilization $u_l$ for a data flow that newly arrives at the network, and determining to boot or turn off the virtual topology in an upper layer according to a value of the maximum link utilization; and
   S4: selecting, by the controller, a suitable path from a K-shortest path set in the currently booted virtual topology, to route the data flow.

2. The energy-efficient traffic scheduling algorithm for an SDN data center network based on a multi-layer virtual topology according to claim 1, wherein the ILP mathematical optimization model in step S1 comprises minimizing the network energy consumption while bearing all network load, and the objective function is as follows:

$$\min \Sigma_{\ell \in L} COS\, T_\ell\, x_\ell + \Sigma_{v \in V} COST_v y_v$$

wherein G(V, L) represents a data center network, L represents a data link set, $T_\ell$ represents any link, V represents a set of switch nodes, v represents any switch node, $COS\,\ell$ represents energy consumption of any link $\ell$, $COST_v$ represents energy consumption of the switch node v, $x_l$ and $y_v$ represent a link state and a switch state respectively, 0 represents turning off, and 1 represents booting.

3. The energy-efficient traffic scheduling algorithm for an SDN data center network based on a multi-layer virtual topology according to claim 2, wherein the link bandwidth constraint condition of the ILP mathematical optimization model in step S1 is:

$$\Sigma_{f \in F} b_f z_f^\ell \le c_l x_l$$

wherein F represents a set of data flows borne by the data center network, f represents a data flow, $b_f$ represents a bandwidth of the data flow, $c_l$ represents a link bandwidth, $z_f^\ell$ represents a state of the data flow f borne by the link $\ell$, 0 represents the data flow is not borne, and 1 represents that the data flow is borne.

4. The energy-efficient traffic scheduling algorithm for an SDN data center network based on a multi-layer virtual topology according to claim 3, wherein the flow conservation constraint condition of the ILP mathematical optimization model in step S1 is:

$$\sum_{\ell \in L_{v'}} b_f z_f^\ell - \sum_{\ell \in L_{v''}} b_f z_f^\ell = \begin{cases} -b_f & v = v_f^s, f \in F \\ b_f & v = v_f^d, f \in F \\ 0 & v \in v - \{v_f^s, v_f^d\}, f \in F \end{cases}$$

wherein $L_v$ represents a set of links connected to a switch v, $L_{v'}$ represents a set of incoming links of the node, $L_{v''}$ represents a set of all outgoing links, and $v_f^s$ and $v_f^d$ represent a source and a destination of any data flow.

5. The energy-efficient traffic scheduling algorithm for an SDN data center network based on a multi-layer virtual topology according to claim 1, wherein the division into the multiple layers of virtual topologies in step S2 specifically comprises the following steps:
   S21: collecting, by the SDN controller, topology information of the data center network by using an address resolution protocol (ARP);
   S22: generating, by using a minimum spanning tree algorithm, a plurality of independent minimum spanning trees with core switches as root nodes according to the number n of the core switches; and storing the core switch and links in each minimum spanning tree into a Gi(Vi, Li);
   S23: selecting G0 as a first-layer virtual topology, VG1= (V0, L0);
   S24: combining the first-layer virtual topology VG1 with G1 to form a second-layer virtual topology VG2, wherein a forming method is defined as follows:
   a) a node set of VG2 is defined as $V_0 \cup V_1 - V_0$; and
   b) a link set of VG2 is defined as $L_0 \cup L_1 - L_0$;
   S25: combining the second-layer virtual topology VG2 with G2 to form a third-layer virtual topology VG3, and so on, to sequentially form higher-layer topologies; and
   S26: booting the first-layer virtual topology VG1, that is, booting switches in the first-layer virtual topology VG1 and setting all the links to a working state, and rendering the links in green; setting all switches and links in other higher-layer topologies to a dormant state, and rendering all the links in red.

6. The energy-efficient traffic scheduling algorithm for an SDN data center network based on a multi-layer virtual topology according to claim 1, wherein step S3 specifically comprises the following steps:

S31: if the maximum link utilization $u_\ell$ >threshold 1, pre-booting the virtual topology in the upper layer, and rendering all the links therein in yellow; otherwise, going to step 34;

S32: if the maximum link utilization $u_\ell$ >threshold 2, booting the virtual topology in the upper layer, and rendering all the links therein in green; otherwise, going to step 34;

S33: if the virtual topology in the upper layer is pre-booted/booted, putting ports with no connected links in the newly booted switches to dormancy;

S34: selecting a path from K-shortest paths, so that all links on the path are green and the maximum link utilization $u_\ell$ is smallest, and routing the data flow on the path; and S35: collecting and calculating the maximum link utilization $u_l$, and if duration in which $u_\ell$ is less than the threshold 1 is longer than T and the topology in the upper layer has been booted, putting the upper layer to dormancy after transfer of the data flow is finished, that is, putting the switches to dormancy and rendering all the links in red.

* * * * *